United States Patent
Pauker et al.

(10) Patent No.: US 7,699,772 B2
(45) Date of Patent: Apr. 20, 2010

(54) VISUAL MEANS OF AN ENDOSCOPE

(75) Inventors: Fritz Pauker, Kissing (DE); Thomas Viehbach, Diepoltsheim (DE); Konstantin Bob, Weinheim (DE)

(73) Assignee: STM Medizintechnik Starnberg GmbH, Weinheim (DE)

(*) Notice: Subject to any disclaimer, the term of this patent is extended or adjusted under 35 U.S.C. 154(b) by 1142 days.

(21) Appl. No.: 11/137,067

(22) Filed: May 25, 2005

(65) Prior Publication Data

US 2005/0272979 A1  Dec. 8, 2005

(30) Foreign Application Priority Data

May 27, 2004 (DE) .................. 10 2004 026 004

(51) Int. Cl.
*A61B 1/04* (2006.01)
(52) U.S. Cl. .................. 600/171; 600/176; 600/109
(58) Field of Classification Search .......... 600/109, 600/117, 118, 129, 133, 156, 160, 164, 168, 600/171, 173, 174–178, 476; 362/572, 574

See application file for complete search history.

(56) References Cited

U.S. PATENT DOCUMENTS

| | | | |
|---|---|---|---|
| 3,404,934 A | | 10/1968 | Brachvogel et al. |
| 4,204,528 A | * | 5/1980 | Termanini .............. 600/109 |
| 4,838,247 A | * | 6/1989 | Forkner ................. 600/173 |
| 4,947,245 A | * | 8/1990 | Ogawa et al. ........... 348/66 |
| 5,547,455 A | | 8/1996 | McKenna et al. |
| 5,800,341 A | * | 9/1998 | McKenna et al. ........ 600/109 |
| 5,871,440 A | * | 2/1999 | Okada ................... 600/129 |
| 5,947,958 A | * | 9/1999 | Woodard et al. ......... 606/15 |
| 6,028,719 A | | 2/2000 | Beckstead et al. |
| 6,261,226 B1 | * | 7/2001 | McKenna et al. ........ 600/129 |
| 6,306,082 B1 | * | 10/2001 | Takahashi et al. ....... 600/173 |
| 6,951,536 B2 | * | 10/2005 | Yokoi et al. ............ 600/128 |
| 7,108,657 B2 | * | 9/2006 | Irion et al. ............. 600/109 |
| 2003/0171648 A1 | * | 9/2003 | Yokoi et al. ............ 600/109 |

FOREIGN PATENT DOCUMENTS

| | | |
|---|---|---|
| AT | 244625 | 1/1966 |
| DE | 10111354 A1 | 9/2002 |

(Continued)

OTHER PUBLICATIONS

European Office Action, issued by the European Patent Office in connection with European application No. 05004308.2-1234, on Aug. 18, 2006, 3 pages.

(Continued)

*Primary Examiner*—John P Leubecker
*Assistant Examiner*—Samuel Candler
(74) *Attorney, Agent, or Firm*—Hanley, Flight & Zimmerman, LLC

(57) ABSTRACT

A visual means of an endoscope comprising at least one optical system or composite optical system arranged at a front area of the endoscope. The at least one optical system or the at least one composite optical system realizes an aperture angle of more than 180° and is arranged such that the field of vision thereof reaches both beyond the normal to the direction of movement and beyond the longitudinal axis of the endoscope pointing ahead.

15 Claims, 6 Drawing Sheets

FOREIGN PATENT DOCUMENTS

| | | |
|---|---|---|
| EP | 0305170 A2 | 3/1989 |
| NR | 244625 | 1/1966 |
| WO | 9526674 | 10/1995 |
| WO | WO 95/26674 | 10/1995 |

OTHER PUBLICATIONS

European Search Report, issued by the European Patent Office in connection with European application No. 05004308.2-1234, on Aug. 22, 2005, 3 pages.

* cited by examiner

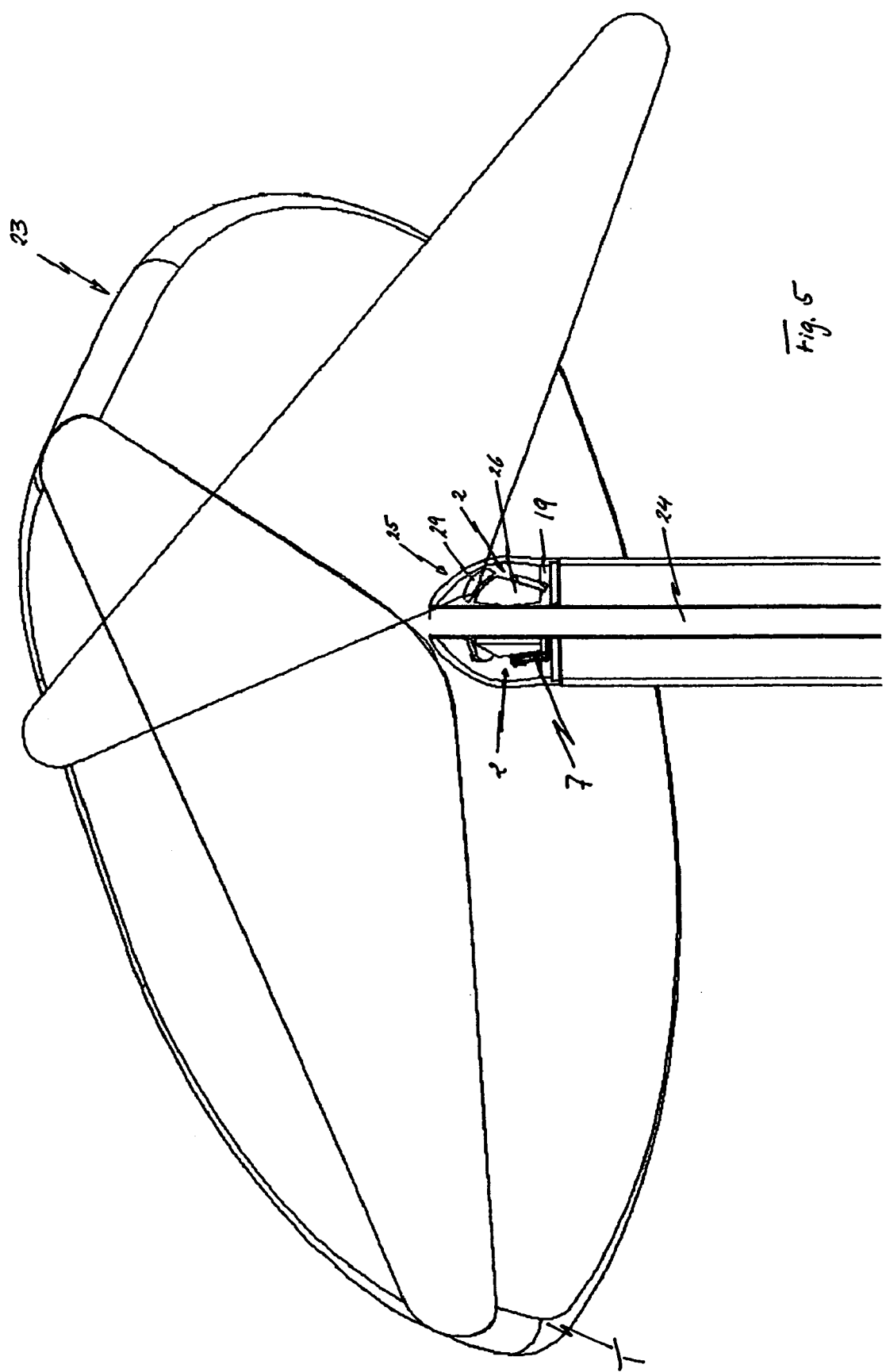

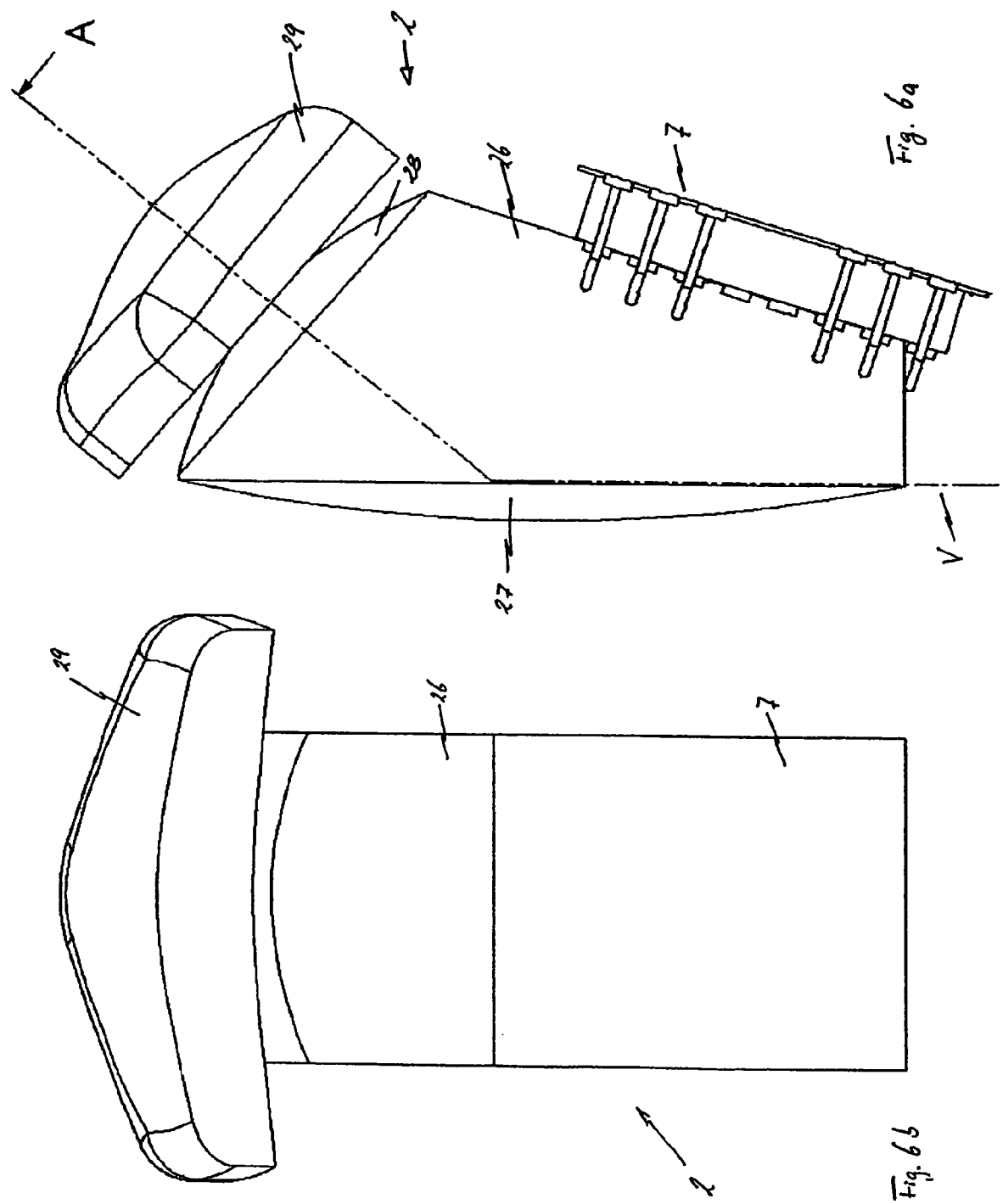

VISUAL MEANS OF AN ENDOSCOPE

BACKGROUND OF INVENTION

1. Field of the Invention

The present invention relates to a visual means of an endoscope.

2. Discussion of the Prior Art

In principle, endoscopes, also in the form of capsules or probes, wherein the latter basically represent endoscopes having no endoscope shaft, are equipped with visual or rather optical systems for exploring body cavities such as the intestines, the stomach, blood vessels, etc., the visual or rather optical systems permitting a visual inspection or image recording of parts of the body cavity on the basis of which diagnoses of diseases can be made. In DE 101 16 056 A1, for instance, a generic endoscopic visualizing device comprising different image systems is known. Concretely spoken, the known visualizing device includes two image systems having different visual angles and different optical parameters (for instance different aperture angles) whose fields of vision directed ahead are partly overlapping and thus permit two different perspective representations of an area to be examined without the endoscope having to be subjected to a change of position or a change of the visualization device being necessary for taking different pictures. By this measure, a stereoscopic visualizing can be obtained, so that a larger total image field can be made available to an operator.

Basically, such image recordings have been available and also technically usable in the field of optics, in particular, since appropriate computer capacities and computing programs adapted thereto which permit a computer-aided electronic image processing have been provided so as to compute a total image from a number of single photographs partly overlapping with respect to their visual angle.

Especially in the field of endoscopy, it has turned out that, for instance, when exploring the intestines the error rate in finding polypi and tumors is still very high. The difficulty consists in the fact that the field of vision of an inserted endoscope is and also has to be directed substantially ahead so as to be capable of visually monitoring and controlling the inserting movement. Consequently, polypi and tumors which are very small in their initial state and might be located at the rear of an intestinal fold remain undiscovered in a plurality of cases.

Therefore the object underlying the invention is to further develop an endoscope or probe in such a manner that an improved visual exploration of a body cavity is permitted.

SUMMARY OF THE INVENTION

The object of the invention is achieved by an endoscope or probe comprising the features of the enclosed claim 1.

Accordingly, the invention consists in designing the visual means of an endoscope to include at least one optical system or one composite optical system which permits an aperture angle of more than 180° (i.e. >90° seen from the longitudinal axis). This optical system or composite optical system is arranged so that the field of vision thereof reaches beyond the normal to the direction of movement or to the longitudinal axis of the endoscope as well as also preferably beyond the longitudinal axis (direction of movement) of the endoscope directed ahead.

The advantage of a particular alignment of the at least one optical system or the at least one composite optical system at an angle with respect to the direction of movement of the endoscope thus permits, when the aperture angle is appropriately selected according to the foregoing definition, a rear view while simultaneously viewing ahead so that at the same time also such positions, for example directly behind intestinal folds, which would be at the blind angle of an optical system directed exclusively ahead and/or possibly to the side, now can be detected and thus examined while maintaining an optimum visual control during a progressive motion of the endoscope.

It is furthermore especially important to arrange the optical system and/or the composite optical system while ensuring the aforementioned properties such that, when it is mounted in the head of an endoscope, a working duct formed therein can remain guided centrally through the endoscope head. This is preferably achieved by arranging a plurality of optical systems along an orbit around the central working duct in the endoscope head and further preferably aligning them at an angle obliquely to the outside with respect to the longitudinal axis of the endoscope. As an alternative to this, it is also possible, of course, to arrange only one optical system in an appropriate alignment out of center and move it along the orbit around the working duct.

A preferred embodiment of the invention moreover provides arranging a type of free shape lens.

Conventional lenses have a symmetric structure which permits a substantially conical field of vision. If, as in the present invention, a plurality of such conical fields of vision are combined, a total visual range at the aforementioned visual angle is resulting, to be sure. However, the normal to the direction of movement of the endoscope is not exceeded all round but only in sections due to the conical shape so that, depending on the number of the optical systems used, more or less large dead ranges are remaining which are not covered by the total angle of vision.

As is already expressed by its name, the free shape lens according to the preferred embodiment of the invention has no symmetric but an individual contour or surface which is determined by analysis or by calculation in response to the number of the optical systems used and the alignment thereof such that also the above-mentioned dead ranges are viewed in this case. Calculating methods for free shape lenses are generally known already in the prior art and published for instance in the document "Optical Society of America A/Vol. 19, No. 3/March 2002" reference to which shall be made explicitly in this context.

Further advantageous configurations of the invention are the subject matter of the other dependent claims.

BRIEF DESCRIPTION OF THE DRAWINGS

The invention will be illustrated hereinafter in greater detail by way of a preferred embodiment with reference to the accompanying drawings.

FIG. 5 shows a side view of a front area of an endoscope equipped with the visual means according to the invention in accordance with a second preferred embodiment of the invention; and FIGS. 6a and 6b show a sectional representation as well as the front view of an optical system according to the second preferred embodiment of the invention.

DETAILED DESCRIPTION OF THE PREFERRED EMBODIMENTS

Figure 1:
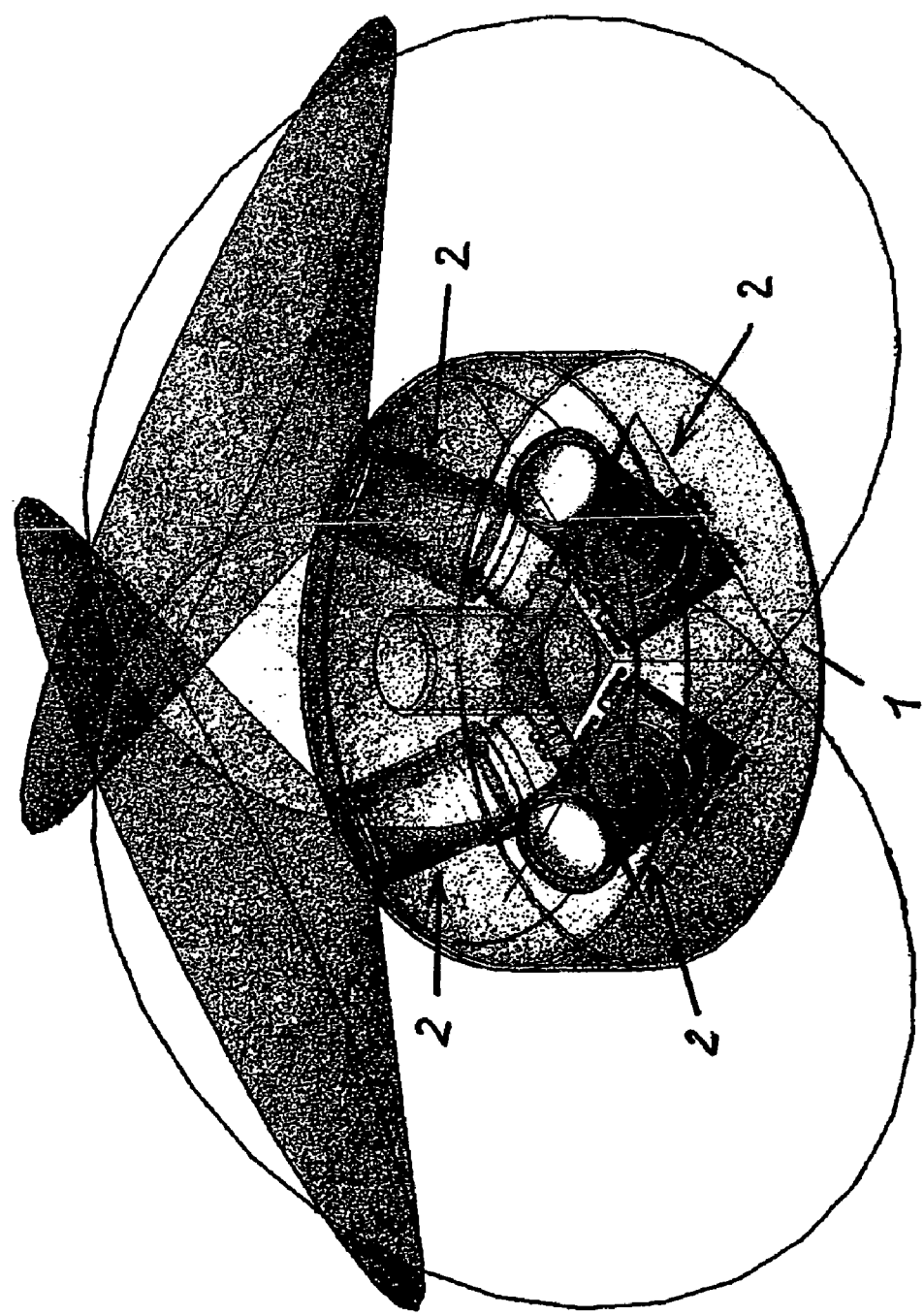
FIG. 1 shows an embodiment of a visual means of an endoscope according to a first preferred embodiment of the invention in a basic perspective view.
Figure 2:
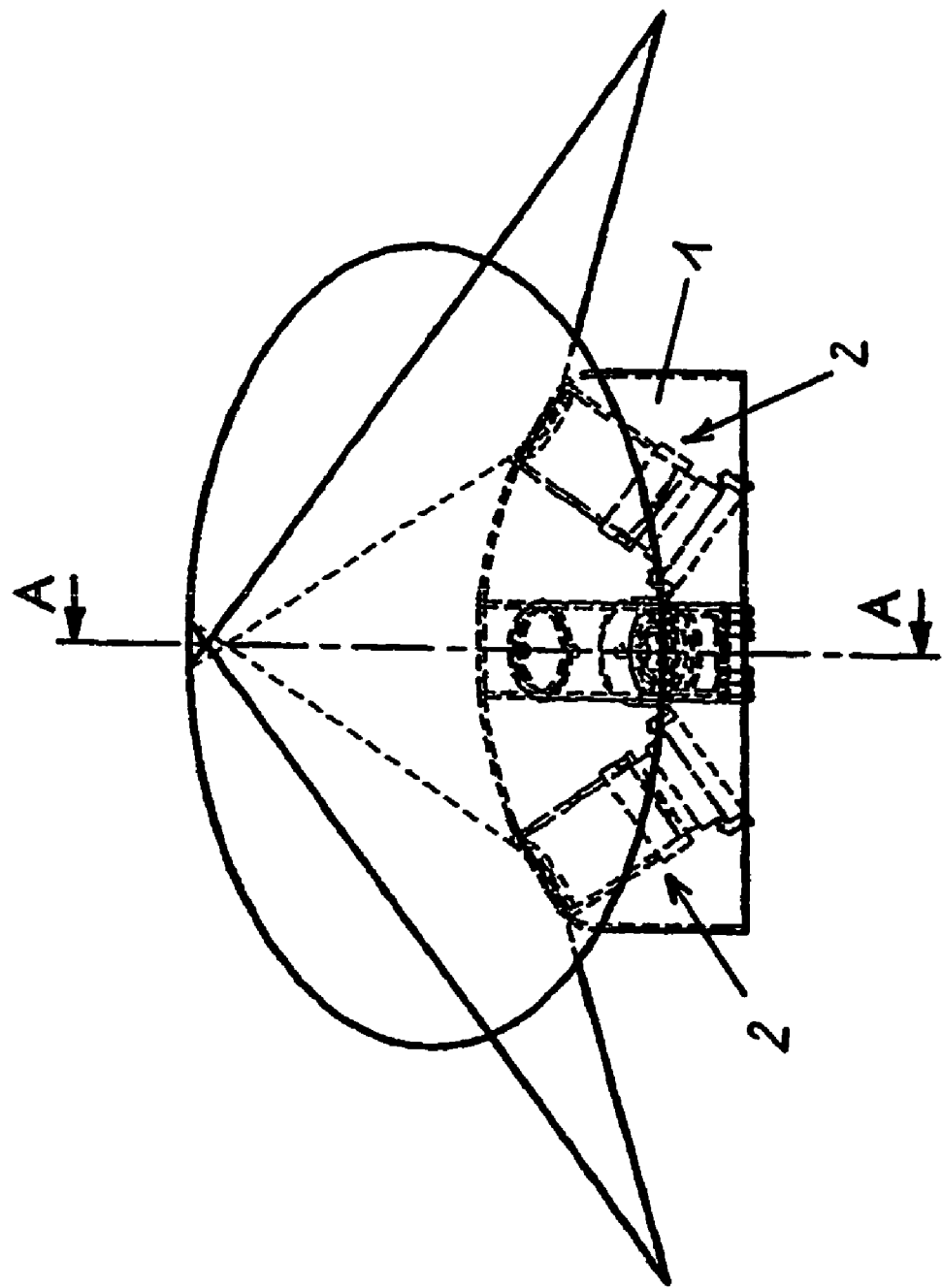
FIG. 2 shows a side view of a front area of an endoscope equipped with the visual means according to the first preferred embodiment of the invention.
Figure 3:
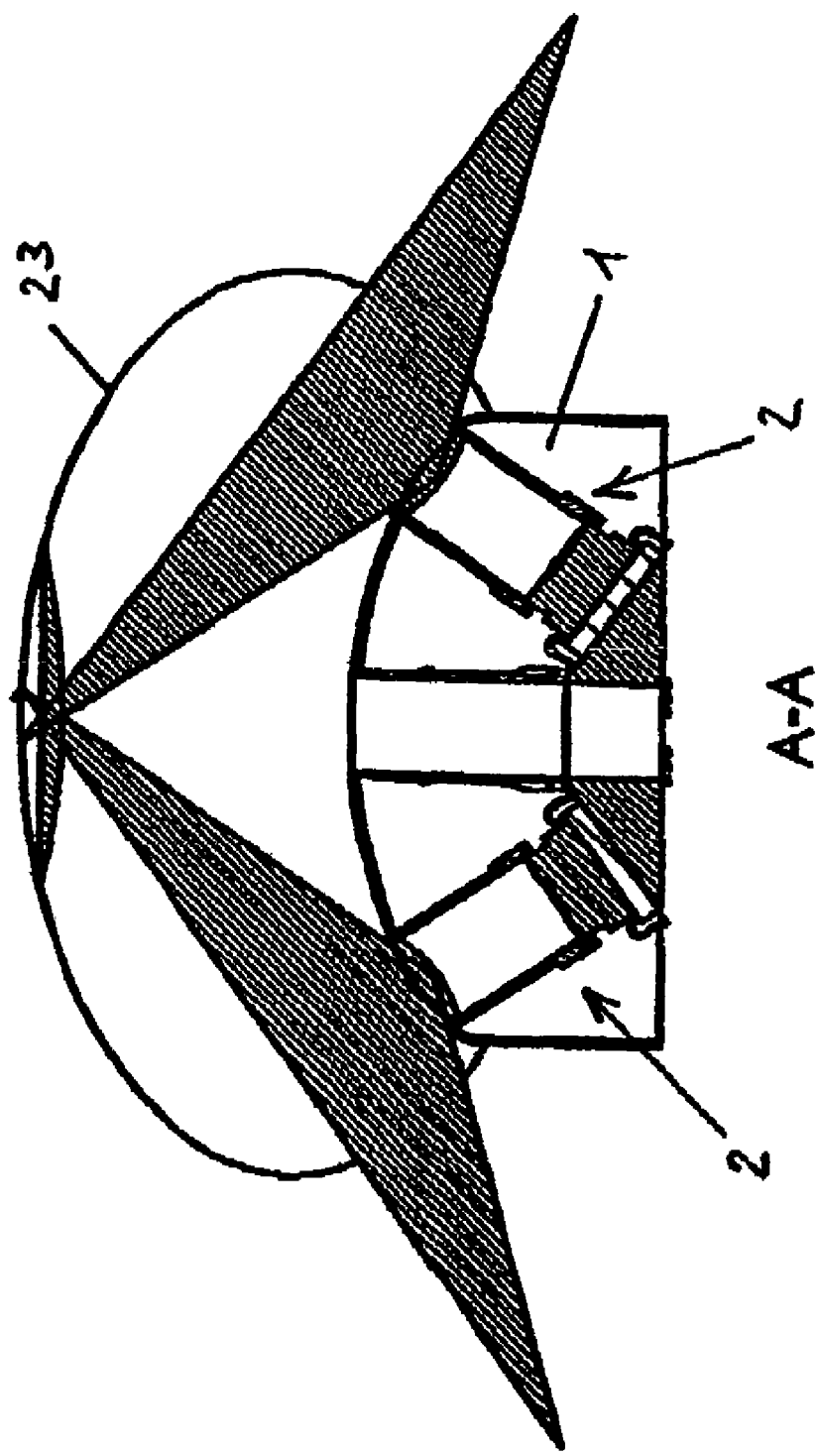
FIG. 3 is a sectional representation along the line A-A from FIG. 2.
Figure 4:
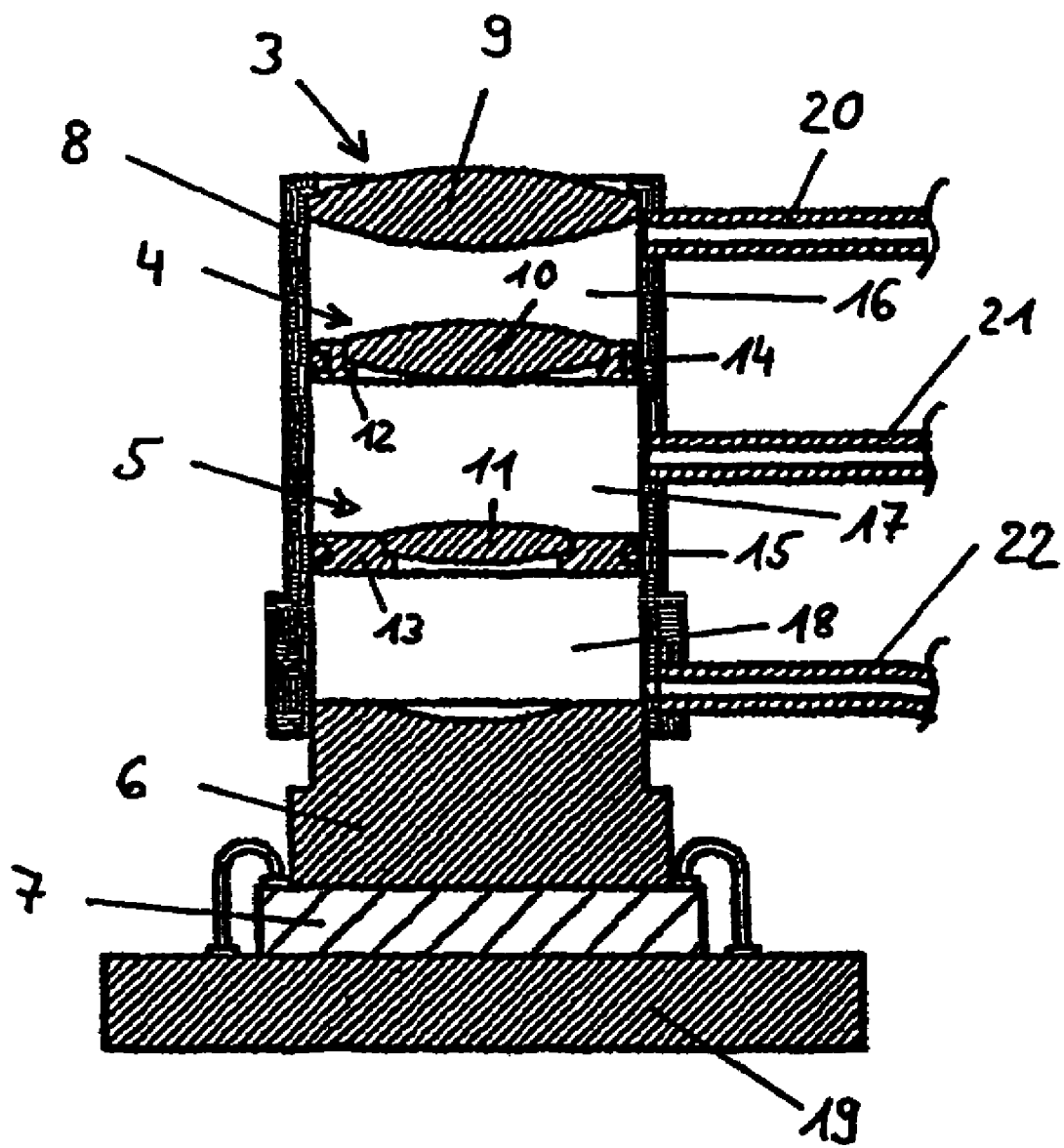
FIG. 4 shows a sectional representation of an optical system including a visual means mounted therein according to a preferred embodiment of the invention.

First of all, it is pointed out that in the present embodiment the endoscope is constructed of an endoscope shaft (not shown) and an endoscope head 1 arranged at the same, wherein a front area thereof is illustrated in FIG. 1. As an alternative, it is, however, also possible to design the endoscope in the form of a probe or a capsule (without a shaft protruding from the body cavity) in which the visual means according to the invention is preferably accommodated in a front area of the capsule.

As one can clearly take from FIGS. 1-4, the visual means according to the invention in the present case consists of four optical systems 2 each of which comprises a lens unit 3-6 and a photosensitive element 7 or microchip arranged beneath the lens unit. Alternatively, however, only two or three optical systems 2 of this type can be arranged. As a further alternative, each of the represented optical systems could be replaced with a plurality of smaller optical systems which are coupled to each other and whose field of vision corresponds at least to that of either of the represented optical systems.

Preferably, each of the optical systems shown in FIG. 1 is designed as a zoom lens. Such a zoom lens consists of a substantially tubular lens cylinder 8. This cylinder is either integrally connected to the leading end of the shown endoscope shaft 1 or is detachably mounted in the same.

The lens cylinder 8 accommodates three lens units 3-5 in the present embodiment. The first lens unit 3 consists of a lens 9 which is fixed at the outermost end of the lens cylinder 8 in the same perpendicularly to the center line of the lens cylinder 8 and in a fluid-tight manner.

Each of the second and third lens units 4, 5 is arranged substantially circularly and perpendicularly to the center line of the lens cylinder 8. Each of them consists of a lens 10, 11, a lens mount 12, 13 in which the respective lens 10, 11 is fixed and a sealing ring 14, 15 enclosing the respective lens mount 12, 13. The outside diameters of the lens mounts 12, 13 are minimally smaller than the inside diameter of the lens cylinder 8 so that the lens mounts 12, 13 are movable in the axial direction of the lens cylinder 8. The sealing rings 14, 15 seal between the peripheral outer surfaces of the respective lens mounts 12, 13 and the inner surface of the lens cylinder 8 so that fluid-tight fluid chambers 16-18 are formed between the lens units 3-6.

The rear opening of the lens cylinder is closed in a fluid-tight manner by a further fourth fixed lens unit 6. Moreover the fourth lens unit 6 has on its face a central concave trough through which the light bundled by the lenses 9-11 is diffracted and transmitted to the optical sensor chip 7. The rear half of the lens unit 6 has a cubic shape, wherein the side lengths thereof in the plane perpendicular to the longitudinal axis of the lens cylinder 8 are adapted to the size of the optical sensor chip 7.

This optical sensor chip 7 is arranged with its photosensitive side at the rear side of the lens unit 6 and converts visual information into electric signals. The optical sensor chip 7 is mounted on its side opposite to the lens cylinder 8 on a functional carrier 19 which in turn is adapted to be fixed inside the front area of the endoscope.

By the fluid-tight arrangement of the four lens units 3-6 the three fluid chambers 16-18 separated from each other in a fluid-tight manner are formed therebetween.

A flexible fluid passage 20-22 not shown in detail which leads from the fluid chambers 16-18 through the endoscope shaft (not shown) to the rear to an operating end of the endoscope shaft is connected to each of the fluid chambers 16-18. A spring which is likewise not shown in detail is inserted in each fluid chamber, which spring in the present embodiment is a spiral spring and is arranged so that the longitudinal axis thereof coincides with the longitudinal axis of the lens cylinder 8. Expediently the outside diameter of the springs is minimally smaller than the inside diameter of the lens cylinder 8 so that the motions of the springs are not decelerated or blocked when they are compressed or expand. The ends of the respective springs are supported at the lens units 3-6 and form an annular bearing surface with the same. These springs can be biased in a desired way so as to position the adjustable lens units 4, 5 in a home or constructional position. An assembly of the objective is facilitated by the fact that the springs space two adjacent lens units 3-6 from each other so that the sensitive lenses 9-11 cannot contact each other when no fluid is filled into the fluid chambers 16-18 yet. Moreover the springs ensure a uniform axial movement by their uniform pressing in the plane perpendicular to the longitudinal axis of the lens cylinder 8 against the lens units 3-6 and thus prevent the lens units 3-6 from tilting or jamming in the lens cylinder 8 during movement.

To the operating end of each fluid passage 20-22 a cylinder (not shown) is connected in which a piston is inserted to slide therein and thus an actuator chamber communicated with the fluid chamber via the respective fluid conduit is delimited.

Each of the fluid chambers 16-18, of the fluid conduits 20-22 and of the actuator chambers is filled with an incompressible fluid which has the property of influencing the light transmission between the lens units as little as possible due to its presence between the lens units.

Concerning the cylinder-piston unit, it is advantageous when the outside diameter of the piston is definitely smaller than the inside diameter of the cylinder. In this way, a reduction is realized for the stroke of the pistons in that an appropriately larger piston stroke is required in the respective actuator chamber for a particular predetermined change of pressure compared to the piston stroke when the inside diameter of the cylinders would coincide with the outside diameter of the pistons. Each of the pistons is moved by an actuator for which electric step motors or magnetic coils, for instance, can be used.

As illustrated in FIG. 1, the four optical systems 2 shown there are distributed at equal angular distances from each other in a circumferential direction of the endoscope and are directed obliquely to the outside. According to FIG. 2, the inclined angle in the present embodiment is 45° with respect to a longitudinal axis of the endoscope, whereas the aperture angle of each optical system is fixed to be 140°. In this way, a field of vision is resulting for each of the optical systems 2 which extends beyond the normal to the direction of movement to the rear as well as ahead beyond the longitudinal axis. As one can recognize especially from FIG. 2, the fields of vision overlap in the front area of the endoscope so that over a particular spherical segment 23 around the endoscope a closed visual scanning field is formed which extends in the form of a divided circle to the rear along the normal to the direction of movement of the endoscope in the area of the four optical systems.

The functional carrier 19 on which the optical systems 2 are mounted is preferably in the form of a square truncated pyramid in the center of which further preferably a working duct is provided.

Each optical system 2 is connected to an image processing station. Depending on whether the endoscope is a conventional design including an endoscope shaft or a probe or capsule design separated from the inlet/outlet of the body cavity to be examined, the aforementioned connection is made by means of electrically or light conducting cables or via radio. The image processing station includes a computer having an output device such as, for instance, a monitor and/or an image forming means. The image processing is performed via conventional image processing programs which have been available in prior art for some time already by means of which a total image can be formed from the simultaneous single pick-ups of the optical systems used.

The functioning of the above-described visual means can be summarized as follows:

When inserting the endoscope into a body canal a treating physician must have a permanent visual possibility of orientation so as to monitor the inserting movement and to appropriately operate the endoscope so that it is guided around the natural canal bends as smoothly as possible. To this end, the endoscopes having a shaft include at their distal end a deflecting as it is called (this is a bendable finger at the free end of which the endoscope head 1 is arranged) which is manually bent via the endoscope shaft in order to be adapted to the individual canal bends. Consequently, it is necessary that the view ahead, i.e. in the direction of movement is constantly given.

At the same time, however, the canal walls have to be inspected for anomalies without a bending movement of the deflecting becoming necessary to this end. This is possible by the visual means according to the invention by the fact that the image signals of the individual optical systems 2 are composed by the digital image processing station so as to form a panoramic image on which, in addition to the view ahead, a 360° all-round/panoramic view with respect to the direction of movement as well as the view obliquely to the rear is shown. In this way it is almost excluded that anomalies are missed.

In the afore-described preferred embodiment a total of four optical systems is shown which are arranged at predetermined angular distances from each other. As an alternative to that, also more or fewer optical systems can be provided, of course. When using only one or possibly two optical system(s), it/they can be rotatably pivoted. In this case, for instance, the above-described truncated cone of the preferred embodiment could be pivoted so that the one or two optical system(s) arranged on the surface area of the truncated cone run(s) along an orbit at a predetermined velocity and thus take up a 360° panoramic view.

In the FIGS. 5 and 6a to 6b now a second preferred embodiment of the invention is shown.

According to FIG. 5 an endoscope head of the second preferred embodiment includes a working duct 24 which opens at a front section of the endoscope head 25. Around the working duct 24 at least two, however preferably three optical systems 2 each consisting of a photosensitive element 7 such as a microchip or a photoconductor cable and of a lens system are arranged and mounted on a carrier plate 19. One of these optical systems 2 is illustrated in greater detail in FIGS. 6a and 6b.

Accordingly, each optical system 2 includes a photosensitive microchip 7 which is fixed in a substantially vertical alignment or an alignment inclined at an acute angle with respect to the normal V to a prism 26 whose one side opposite to the chip 7 forms an optical reflection surface 27. In the simplest case this side is vaporized to the inside.

The prism 26 furthermore has a light incidence side formed by an optically active surface 28, where appropriate, which is outwardly inclined at a particular (preferably acute) angle likewise with respect to the normal V such that the light incidence extends obliquely from above to the optically active surface 28.

The free shape lens 29 is arranged ahead of the light incidence side 28 of the prism 26. In general free shape lenses are known from prior art, as they are used for instance in motor vehicle headlights for the diffraction of emitted light.

In the present case, however, the free shape lens 29 is designed according to the invention such that the visual cone to be attained hereby is not symmetrical, i.e. circular in cross-section, but covers a cross-sectional area which is different from the circular form. This cross-sectional shape is dependent on the number of optical systems 2 and thus on their angular distance from each other as well as on the inclination and/or the light incidence angle with respect to the normal V which is defined by the shape of the prism 26.

As a function of these two parameters the free shape lens 29 is shaped by analysis or by way of computing models known in prior art such that the angle of vision to be attained by the optical system 2 exceeds the normal to the length of the endoscope to the rear over an as large circumferential angle as possible with respect to the endoscope head 25. In other words, in the most favorable case the free shape lens 29 is shaped in such a way that the angle of vision exceeding the normal to the endoscope axis to the rear is not formed as segment of a circle as in the case of a simple (circular) visual cone according to FIG. 1, but it has an elliptical shape. In this event the substantially triangular dead ranges still clearly visible in FIG. 1 of the overlapping fields of vision of the individual optical systems are reduced, if at all, to small spots T which are practically insignificant in medical examinations.

What is claimed is:

1. A visual means of an endoscope comprising:
   an endoscope shaft having a distal end;
   an endoscope head located at the distal end of the endoscope shaft;
   a central working duct centrally formed in the endoscope head that opens at a front end section of the endoscope head; and
   at least three optical systems arranged in the endoscope head, each having a field of vision, and each comprising at least one image capture device, wherein the endoscope has a direction of movement and a normal to the direction of movement, wherein the at least three optical systems realize an aperture angle of more than 180°, wherein the at least three optical systems are disposed such that the fields of vision collectively reach beyond the normal to the direction of movement, wherein all of the at least three optical system are arranged along an orbit around the central working duct in the endoscope head, and wherein all of the at least three optical systems are aligned at an angle obliquely to a longitudinal axis of the endoscope such that the fields of vision of the at least three optical systems overlap in a front area of the endoscope so that over a particular spherical segment around the endoscope head, a closed visual scanning field is formed.

2. A visual means according to claim 1, wherein the at least three optical systems are arranged at equal angular distances in a circumferential direction of the endoscope.

3. A visual means according to claim 2, wherein each optical system realizes an aperture angle of 120° to 145°.

4. A visual means according to claim 2, wherein each optical system is aligned at an angle of from 40° to 50° with respect to a forward direction of movement of the endoscope.

5. A visual means according to claim 2, wherein each optical system takes a single picture that can be transmitted via an image transmission means to an image processing station for digital formation of a total image.

6. A visual means according to claim 2, wherein each optical system includes at least one free shape lens.

7. A visual means according to claim 6, wherein the free shape lens is designed such that the field of vision of each optical system reaching beyond the normal to the direction of movement to a rear expands in the circumferential direction of the endoscope so that dead ranges between two overlapping fields of vision of two optical systems are minimized beyond this normal.

8. A visual means according to claim 1, wherein each optical system realizes an aperture angle of 120° to 145°.

9. A visual means according to claim 8, wherein each optical system realizes an aperture angle of 140°.

10. A visual means according to claim 1, wherein each optical system is aligned at an angle of 40° to 50° with respect to a forward direction of movement of the endoscope.

11. A visual means according to claim 10, wherein each optical system is aligned at an angle of 45° with respect to the forward direction of movement of the endoscope.

12. A visual means according to claim 1, wherein each optical system takes a single picture that can be transmitted via an image transmission means to an image processing station for digital formation of a total image.

13. A visual means according to claim 1, wherein each optical system includes at least one free shape lens.

14. A visual means according to claim 13, wherein the free shape lens is designed such that the field of vision of each optical system reaching beyond the normal to the direction of movement to a rear expands in the circumferential direction of the endoscope so that dead ranges between two overlapping fields of vision of two optical systems are minimized beyond this normal.

15. A visual means according to claim 1, wherein the central working duct is formed along the central longitudinal axis of the endoscope shaft.

* * * * *